US008528938B2

(12) United States Patent
Tombe

(10) Patent No.: US 8,528,938 B2
(45) Date of Patent: Sep. 10, 2013

(54) RESTRAINING DEVICE

(75) Inventor: Hideyuki Tombe, Minato-ku (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/594,380

(22) Filed: Aug. 24, 2012

(65) Prior Publication Data

US 2013/0049340 A1  Feb. 28, 2013

(30) Foreign Application Priority Data

Aug. 25, 2011  (JP) ................................. 2011-183412

(51) Int. Cl.
*B60R 22/34*  (2006.01)

(52) U.S. Cl.
USPC ........ 280/807; 280/808; 242/390.8; 297/477; 701/45

(58) Field of Classification Search
USPC ............. 280/806, 807, 808, 801.1; 180/268; 242/382, 390.8, 390.9, 390; 297/477; 701/45
See application file for complete search history.

(56) References Cited

U.S. PATENT DOCUMENTS

| | | | | | |
|---|---|---|---|---|---|
| 4,511,097 | A | * | 4/1985 | Tsuge et al. | 242/390.9 |
| 4,666,097 | A | * | 5/1987 | Tsuge et al. | 242/390.1 |
| 4,708,365 | A | * | 11/1987 | Nakano et al. | 280/801.1 |
| 7,216,827 | B2 | * | 5/2007 | Tanaka et al. | 242/390.8 |
| 7,237,640 | B2 | * | 7/2007 | Tobata | 180/268 |
| 7,517,025 | B2 | * | 4/2009 | Tanaka et al. | 297/477 |
| 7,600,600 | B2 | * | 10/2009 | Inuzuka et al. | 180/272 |
| 7,726,693 | B2 | * | 6/2010 | Koide | 280/807 |
| 7,953,532 | B2 | * | 5/2011 | Odate et al. | 701/45 |
| 2003/0116669 | A1 | * | 6/2003 | Fujii et al. | 242/383 |
| 2005/0139408 | A1 | * | 6/2005 | Bullinger et al. | 180/268 |
| 2005/0252710 | A1 | * | 11/2005 | Akaba et al. | 180/268 |
| 2006/0072911 | A1 | * | 4/2006 | Bolz et al. | 388/803 |
| 2006/0097096 | A1 | * | 5/2006 | Heckmayr | 242/374 |
| 2010/0057303 | A1 | * | 3/2010 | Odate | 701/45 |
| 2011/0140504 | A1 | * | 6/2011 | Bolton et al. | 297/477 |

FOREIGN PATENT DOCUMENTS

| | | |
|---|---|---|
| JP | 2004-017765 | 1/2004 |
| JP | 2006-298187 | 11/2006 |
| JP | 2009-278729 | 11/2009 |
| JP | 2011-025764 | 2/2011 |

* cited by examiner

*Primary Examiner* — Joseph Rocca
*Assistant Examiner* — Keith Frisby
(74) *Attorney, Agent, or Firm* — Foley & Lardner LLP

(57) ABSTRACT

The motor drive current has a value increased for a time necessary for the clutch operation to mechanically connect the motor and spool and, after the clutch operation, the drive current has a value necessary only for preventing the rotation of the spool due to the belt tension. In this way, the power necessary only for restraining the occupant is consumed after the operation of the clutch is ensured. Then, it is possible to reduce the motor power consumption and suppress heat generation of the motor.

9 Claims, 8 Drawing Sheets

RESTRAINING DEVICE

CROSS-REFERENCE TO RELATED APPLICATION

This application claims the benefit of Japanese Patent Application No. 2011-183412, filed on Aug. 25, 2011, the entire disclosure of which is incorporated by reference herein.

FIELD

This application relates generally to a restraining device, and more particularly, to a restraining device for restraining the occupants of a vehicle.

BACKGROUND

Vehicles such as cars are equipped with seat belts for protecting the occupants from unexpected events such as an emergency stop and collision. Among such seat belts, three-point seat belts are extensively used because they are easy to wear and provide a relatively large restraining force.

The restraining device disclosed in Unexamined Japanese Patent Application Kokai Publication No. 2004-17765 comprises a retractor winding up the belt for restraining an occupant. The retractor is provided with an electric device for adjusting the tension of the belt according to the force to apply to the occupant.

The aforementioned electric device controls the retractor in the manner such that the belt has the tension of a first target value while the vehicle is normally running. Then, the electric device controls the retractor so that the belt has the tension of a second target value greater than the first target value in time of need because a large force is applied to the occupant such as when the vehicle makes an emergency stop or a turn. In such a case, the electric device gradually increases the tension of the belt from the first target value to the second target value. In this way, it is possible to restrain the occupant with a proper force without giving any discomfort.

The restraining device disclosed in the Unexamined Japanese Patent Application Kokai Publication No. 2004-17765 controls the power supply in the manner that the motor current has a target value according to the belt tension. Therefore, it is difficult to detect the current when the target current value is low, thus hampering accurate power supply to the motor. Furthermore, insufficient motor torque may cause the clutch operation to fail. On the other hand, when the target current value is high, a problem is that the motor generates a large quantity of heat.

For driving the motor used for the retractor (for example, a motor with a brush for a contact point), a voltage equal to or greater than the minimum operation voltage should be applied to the motor. The minimum operation voltage sometimes goes up as the motor deteriorates (for example, deterioration with time). Then, the motor operation may become unstable after the motor deteriorates to some extent.

The present invention is invented under the above circumstances and an exemplary object of the present invention is to operate a retractor accurately and reduce the motor power consumption by supplying to the motor used for the retractor the power of a level appropriate to the situation.

SUMMARY

In order to achieve the above object, the restraining device according to the present invention is a restraining device for restraining an occupant sitting in a seat, comprising:

a spool winding up a belt for restraining the occupant;
a motor rotating the spool;
a gear unit transmitting an output of the motor to the spool;
a clutch mechanically connecting the motor and the gear unit by means of the rotation of the motor; and
a supply unit supplying power to the motor in the manner that a first power supplied until the motor and the gear unit are connected by the clutch is greater than a second power supplied after the motor and the gear unit are connected.

The supply unit may supply power to the motor in the manner such that the average output voltage until the motor and the gear unit are connected is greater than the average output voltage after the motor and the gear unit are connected.

The supply unit may supply power to the motor in the manner such that the current supplied until the motor and the gear unit are connected is greater than the current supplied after the motor and the gear unit are connected.

The supply unit may perform PWM control.

The supply unit may supply the first power for a preset time.

The restraining device of the present invention may comprise:
a first detection system detecting the connection between the motor and the gear unit by the clutch,
wherein the supply unit may supply the first power until the first detection system detects the connection between the motor and the gear unit.

The restraining device of the present invention may comprise:
a second detection system detecting the disconnection between the motor and the gear unit,
wherein the supply unit may supply power to the motor in the manner that a first power supplied until the motor and the gear unit are connected is greater than a second power supplied after the motor and the gear unit are connected when the second detection system detects the disconnection between the motor and the gear unit.

The supply unit may periodically supply power to the motor in the manner that a first power supplied until the motor and the gear unit are connected is greater than a second power supplied after the motor and the gear unit are connected.

The spool may be provided on one side of the seat, and the restraining device of the present invention may comprise:
a fixture provided on one side of the seat and to which one end of the belt pulled out from a retractor is secured;
a support member supporting the belt between the spool and the fixture;
a buckle provided on the other side of the seat; and
a tongue provided on the belt and detachably fitted in the buckle.

BRIEF DESCRIPTION OF THE DRAWINGS

A more complete understanding of this application can be obtained when the following detailed description is considered in conjunction with the following drawings, in which.

DETAILED DESCRIPTION

Figure 1:
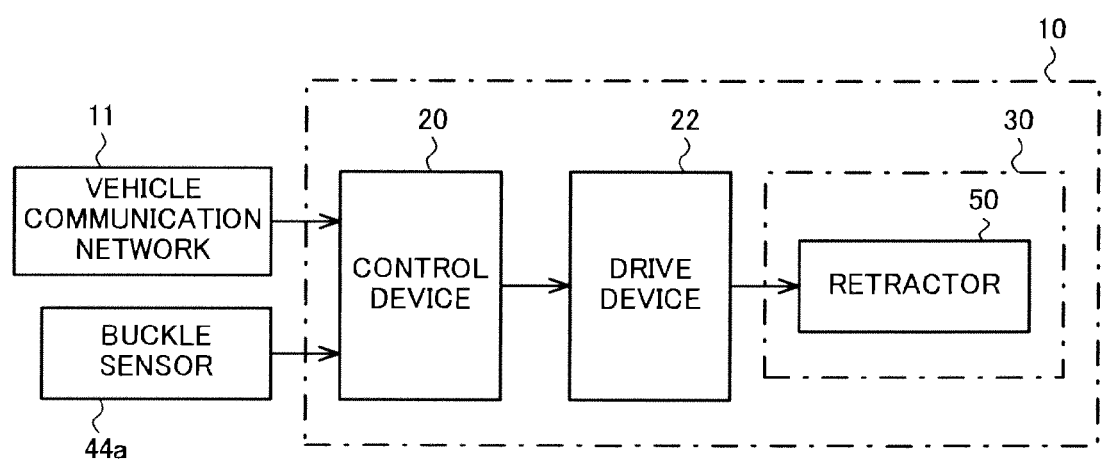
FIG. 1 is a block diagram of the restraining device according to the embodiment.

An embodiment of the present invention will be described hereafter with reference to the drawings. FIG. 1 is a block diagram of a restraining device 10 according to this embodiment. The restraining device 10 is a device for optimally restraining an occupant in accordance with the acceleration in the traveling direction of the vehicle and in the direction perpendicular to the traveling direction. The traveling direction of the vehicle is referred to as the X-axis direction and the direction perpendicular to the traveling direction is referred to as the Y-axis direction hereafter for convenience of explanation.

As shown in FIG. 1, the restraining device 10 has a restraining unit 30 for restraining an occupant, a control device 20 detecting the vehicle running state based on output from a vehicle communication network 11 or a buckle sensor 44a, and a drive device 22 driving a retractor 50 of the restraining unit 30 based on instruction from the control device 20.

The vehicle communication network 11 is an in-vehicle network such as a CAN (controller area network), LIN (local interconnect network), and K-LINE. The control unit or the like of a vehicle can acquire information on, for example, the vehicle speed, acceleration in the X-axis direction (the traveling direction), and acceleration in the Y-axis direction (the direction perpendicular to the traveling direction) by communicating with the vehicle communication network 11.

Figure 2:
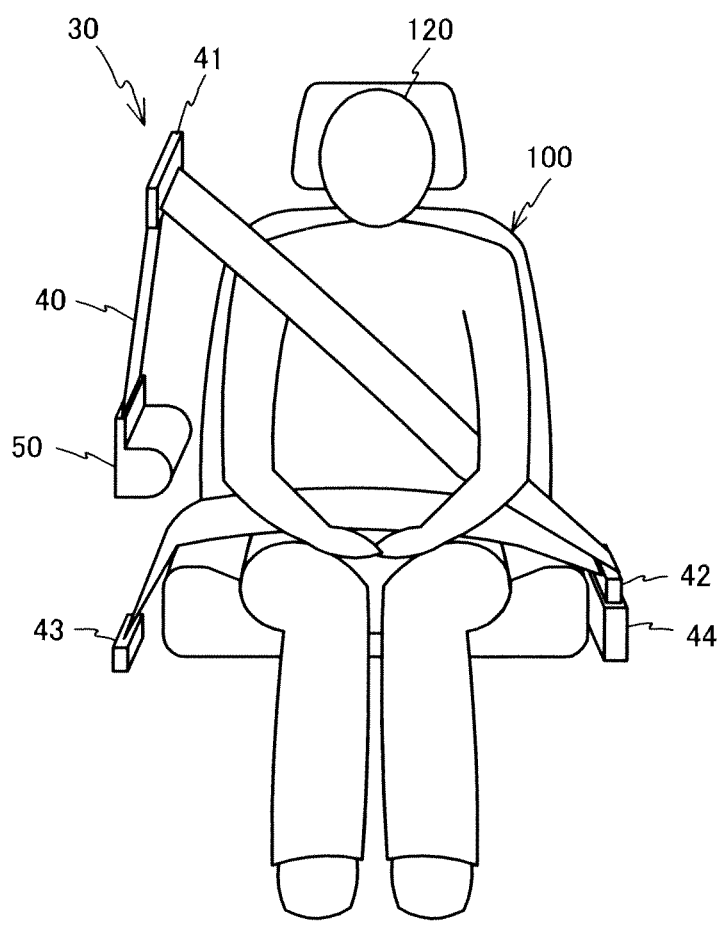
FIG. 2 is an illustration showing the restraining unit.

FIG. 2 is an illustration showing the restraining unit 30 for restraining an occupant 120 sitting in a seat 100. As shown in FIG. 2, the restraining unit 30 is a three-point seat belt. The restraining unit 30 has a belt 40 restraining the occupant 120, and a retractor 50 provided to the right of the seat 100 and winding up and housing the belt 40.

The most part of the belt 40 constituting the restraining unit 30 is generally wound up in the retractor 50. The end of the belt 40 pulled out from the retractor 50 is drawn to the right of the seat bottom of the seat 100 (or just below the retractor 50) via a guide 41 secured to the B pillar of the vehicle and secured to an anchor 43. A tongue 42 provided on the belt 40 between the guide 41 and anchor 43 is fitted in a buckle 44 by the occupant 120, whereby the occupant 120 is restrained by the restraining unit 30.

The buckle sensor 44a shown in FIG. 1 detects whether the tongue 42 is fitted in the buckle 44. The buckle sensor 44a is, for example, a limit switch having a contact point to be turned on when the tongue 42 is fitted in the buckle 44.

Figure 3:
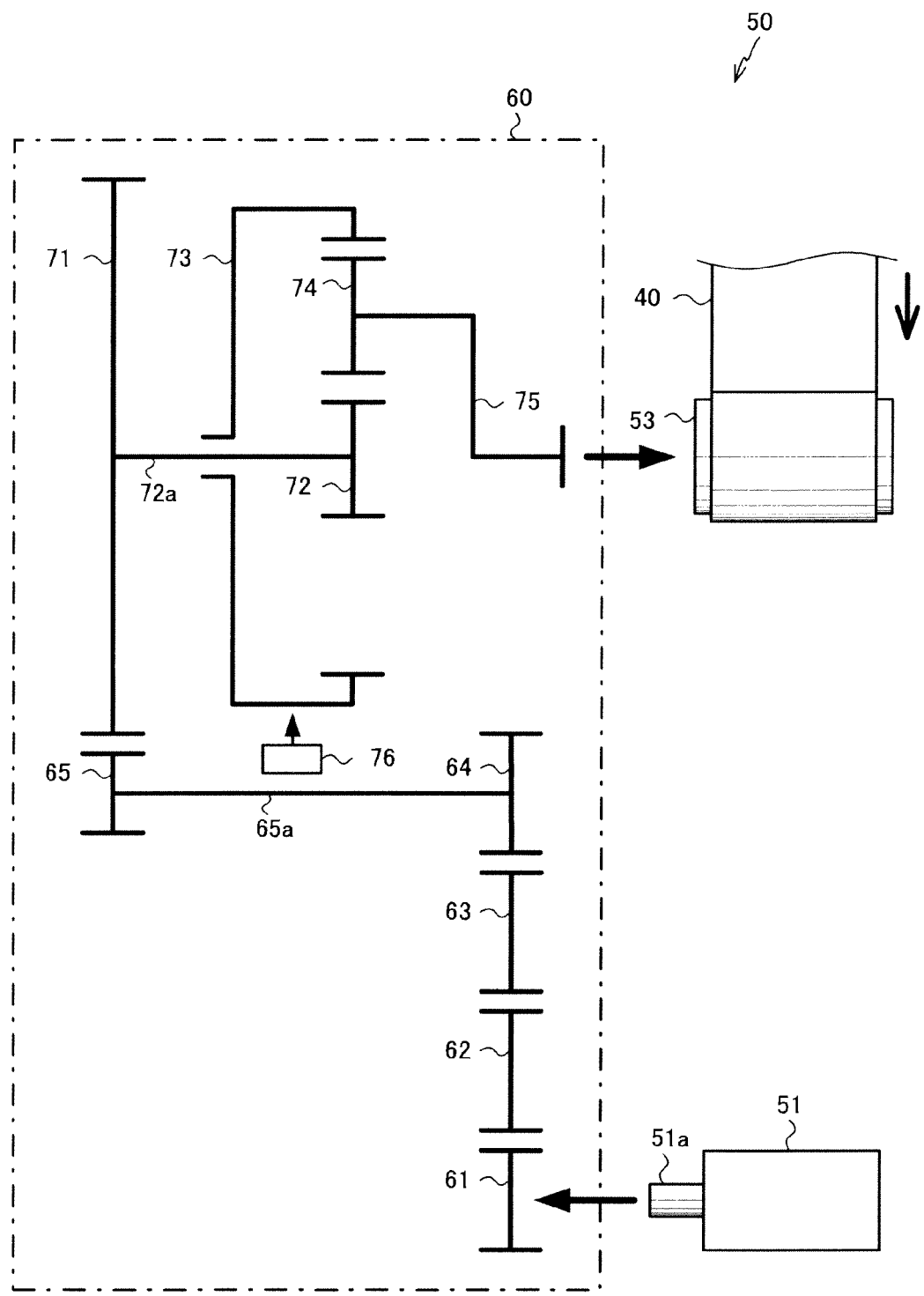
FIG. 3 is a diagram schematically showing the configuration of the retractor.

FIG. 3 is a diagram schematically showing the configuration of the retractor 50. As shown in FIG. 3, the retractor 50 has a spool 53 for winding up the belt 40, a motor 51 for rotating the spool 53, and a gear unit 60 transmitting the output of the motor 51 to the spool 53.

The spool 53 is a cylindrical member. The spool 53 is mechanically connected to the motor 51 via the gear unit 60.

The motor 51 is a direct-current motor having a rated voltage of, for example, 12V. Powered by the control device 20, the motor 51 rotates the gears constituting the gear unit 60.

Figure 4:
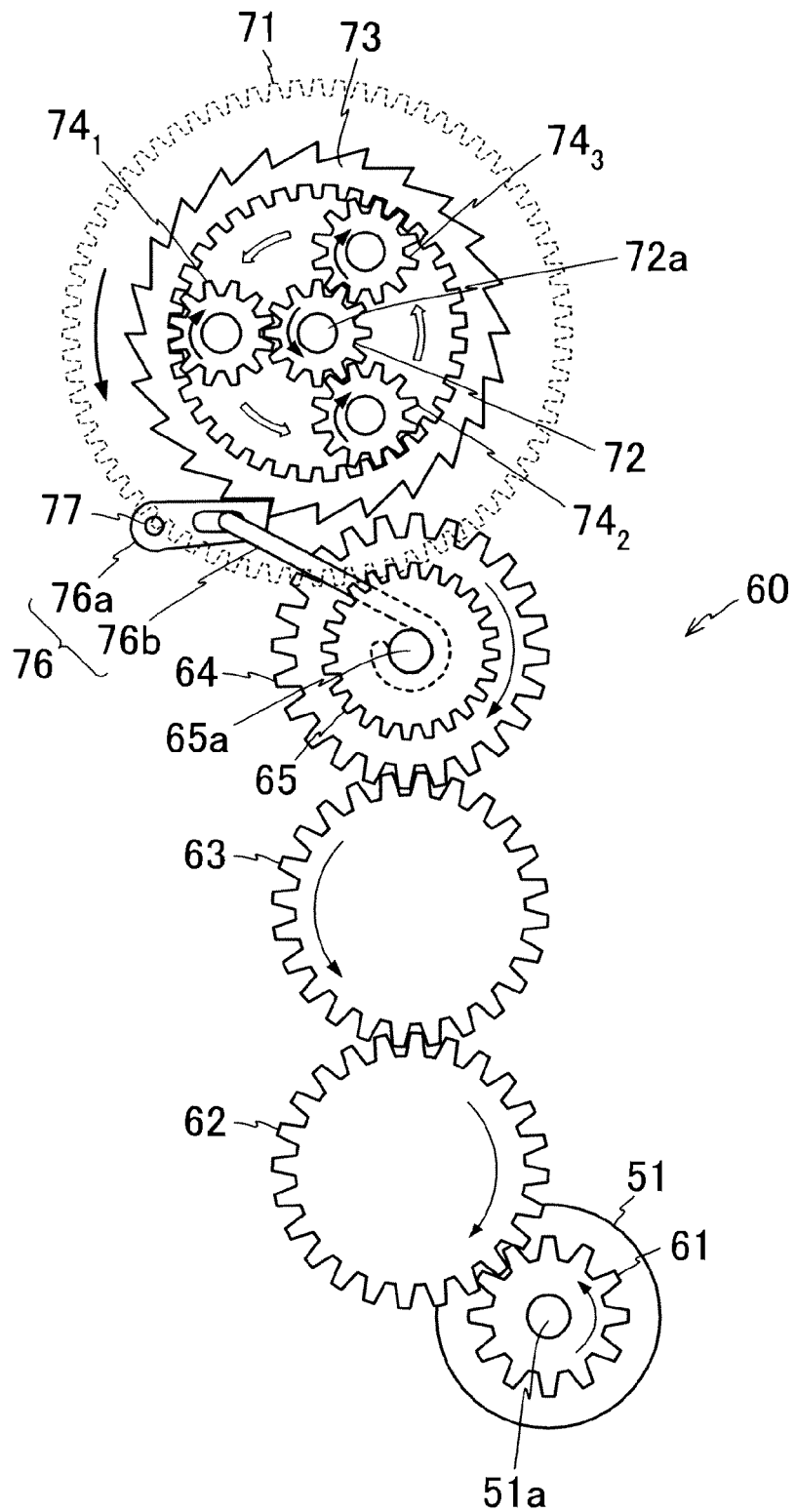
FIG. 4 is an illustration showing the gear unit.

FIG. 4 is an illustration showing the gear unit 60. As seen from FIGS. 3 and 4, the gear unit 60 is composed of a spool drive system (71 to 74) consisting of a sun gear 72, three planet gears 74, an internal gear 73, and a driven gear 71 coupled to the sun gear 72, a first drive gear 61 secured to the rotation shaft 51a of the motor 51, a transmission system (62 to 65) consisting of a first intermediate gear 62, a second intermediate gear 63, a third intermediate gear 64, and a second drive gear 65 coupled to the third intermediate gear 64 via a rotation shaft 65a, a clutch 76 for mechanically connecting the drive system and transmission system, and a not-shown casing housing the above parts.

The first drive gear 61 is secured to the rotation shaft 51a of the motor 51. As the motor 51 rotates forward, the first drive gear 61 rotates in the arrowed direction.

The first intermediate gear 62 is a gear wheel engaging with the first drive gear 61. The first intermediate gear 62 rotates as the first drive gear 61 rotates. Then, as the motor 51 rotates forward, the first intermediate gear 62 rotates in the arrowed direction.

The second intermediate gear 63 is a gear wheel engaging with the first intermediate gear 62. The second intermediate gear 63 rotates as the first intermediate gear 62 rotates. Then, as the motor 51 rotates forward, the second intermediate gear 63 rotates in the arrowed direction.

The third intermediate gear 64 is a gear wheel engaging with the second intermediate gear 63. The third intermediate gear 64 rotates as the second intermediate gear 63 rotates. Then, as the motor 51 rotates forward, the third intermediate gear 64 rotates in the arrowed direction.

Coupled to the third intermediate gear 64 by the rotation shaft 65a, the second drive gear 65 is integrated with the third intermediate gear 64. The second drive gear 65 rotates around the rotation shaft 65a together with the third intermediate gear 64.

The driven gear 71 is a gear wheel engaging with the second drive gear 65. The driven gear 71 rotates as the second drive gear 65 rotates. Then, as the motor 51 rotates forward, the driven gear 71 rotates in the arrowed direction.

As seen from FIG. 3, coupled to the driven gear 71 by the rotation shaft 72a, the sun gear 72 is integrated with the driven gear 71. The sun gear 72 rotates around the rotation shaft 72a together with the driven gear 71. Then, as the motor 51 rotates forward, the sun gear 72 rotates in the arrowed direction as shown in FIG. 4.

The three planet gears $74_1$, $74_2$, and $74_3$ are gear wheels engaging with the sun gear 72. As the motor 51 rotates forward, these planet gears 74 relatively rotate around the sun gear 72 as shown by the outlined arrows. As seen from FIG. 3, the three planet gears 74 are coupled to each other by a carrier 75.

The internal gear 73 is an annular gear having an inner tooth engaging with the planet gears 74 on the inner circumference. The internal gear 73 has a ratchet tooth for preventing the clockwise rotation in FIG. 4 on the outer circumference.

The clutch 76 consists of a pawl 76a and a wire 76b. The pawl 76a is supported by, for example, a not-shown casing or a support member in the manner that one end can rotate around a rotation shaft 77.

The wire 76b is wound around the rotation shaft 65a of the third intermediate gear 64 and second drive gear 65 at one end and inserted in an elongated hole formed in the pawl 76a at the other end. As the motor 51 rotates forward, the wire 76b rotates clockwise around the rotation shaft 65a, whereby the pawl 76a rotates counterclockwise. Furthermore, as the motor 51 rotates backward, the wire 76b rotates counterclockwise around the rotation shaft 65a, whereby the pawl 76a rotates clockwise.

As seen from FIGS. 3 and 4, with the gear unit 60 having the above configuration, the first drive gear 61 rotates as the motor 51 rotates forward. Then, the rotation force of the motor 51 is transmitted to the first intermediate gear 62, second intermediate gear 63, and third intermediate gear 64 in sequence, whereby the rotation shaft 65a rotates in the arrowed direction. Consequently, as shown in FIG. 4, the pawl 76a engages with the ratchet tooth of the internal gear 73 to restrict the clockwise rotation of the internal gear 73.

As the motor 51 further rotates forward while the pawl 76a engages with the ratchet tooth of the internal gear 73, the planet gears 74 rotate in the direction indicated by the outlined arrows. Then, as seen from FIG. 3, the carrier 75 rotates and the spool 53 rotates. Consequently, the belt 40 is wound up on the spool 53.

Figure 5:
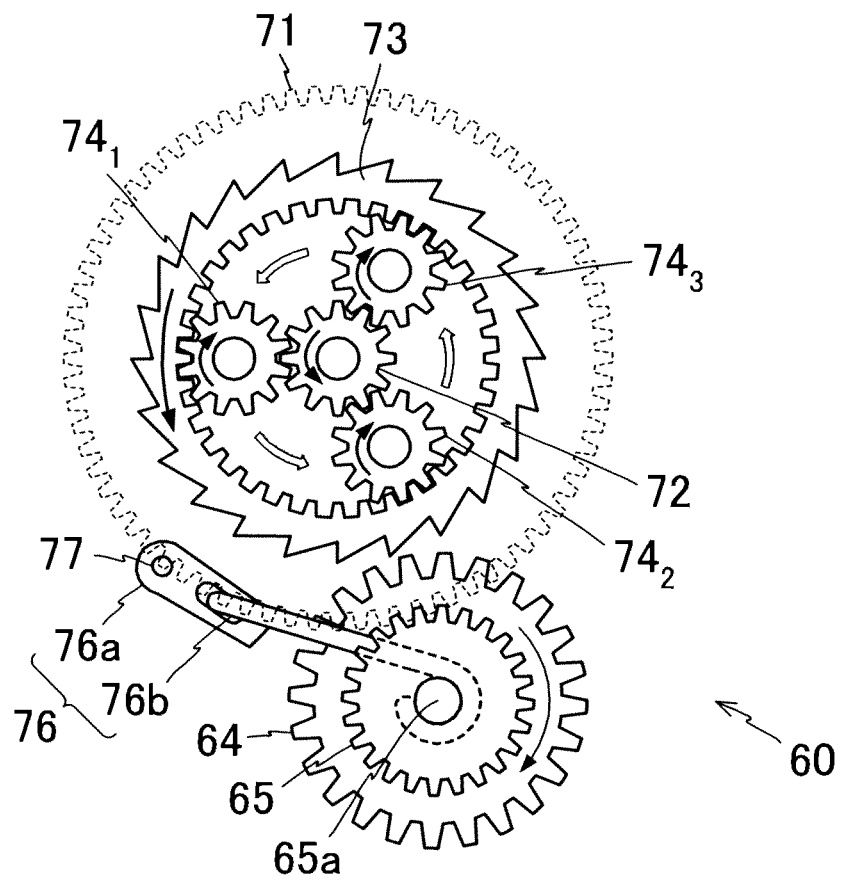
FIG. 5 is an illustration showing a part of the gear unit.

Furthermore, as the motor 51 rotates backward and the rotation shaft 65a rotates in the direction opposite to the arrowed direction, as shown in FIG. 4, the pawl 76a engaged with the ratchet tooth of the internal gear 73 rotates to the position shown in FIG. 5. Consequently, the rotation of the internal gear 73 is derestricted and the internal gear 73 is released.

After the internal gear 73 is released, the spool 53 connected to the carrier 75 does not rotate even if the motor 51 rotates. Therefore, the spool 53 can rotate independently from the motor 51.

In other words, as the pawl 76a of the clutch 76 engages with the ratchet tooth of the internal gear 73, the motor 51 and spool 53 are mechanically connected. Furthermore, as the pawl 76a of the clutch 76 is separated from the ratchet tooth of the internal gear 73 to release the internal gear 73, the motor 51 and spool 53 are mechanically disconnected.

The state in which the pawl 76a of the clutch 76 is engaged with the ratchet tooth of the internal gear 73 is simply referred to as the state in which the clutch 76 is on hereafter for convenience of explanation. On the other hand, the state in which the pawl 76a of the clutch 76 is separated from the ratchet tooth of the internal gear 73 is simply referred to as the state in which the clutch 76 is off.

The control device 20 is, for example, a computer having a CPU, a main storage used as the work area of the CPU, and an auxiliary storage storing programs executed by the CPU and various parameters. The control device 20 communicates with the vehicle communication network 11 to acquire vehicle information such as the vehicle speed and acceleration. Furthermore, the control device 20 determines whether the occupant 120 is restrained in the seat 100 by the belt 40 via the buckle sensor 44a. Then, the control device 20 instructs the drive device 22 to execute operation for restraining the occupant 120 with a weak force when, for example, the vehicle speed and the acceleration in the Y-axis direction become equal to or greater than a given reference value while the occupant 120 is restrained by the belt 40.

The drive device 22 includes a switching element for PWM (pulse width modulation) control on the motor 51. The drive device 22 generates a voltage signal V having the duty ratio according to the running state informed by the control device 20 and supplies the signal to the motor 51. For example, the voltage signal V is a signal driving the motor 51 for taking up slack of the belt 40 or for reducing influence of an external force applied to the occupant 120 due to the behavior of the vehicle.

Figure 6:
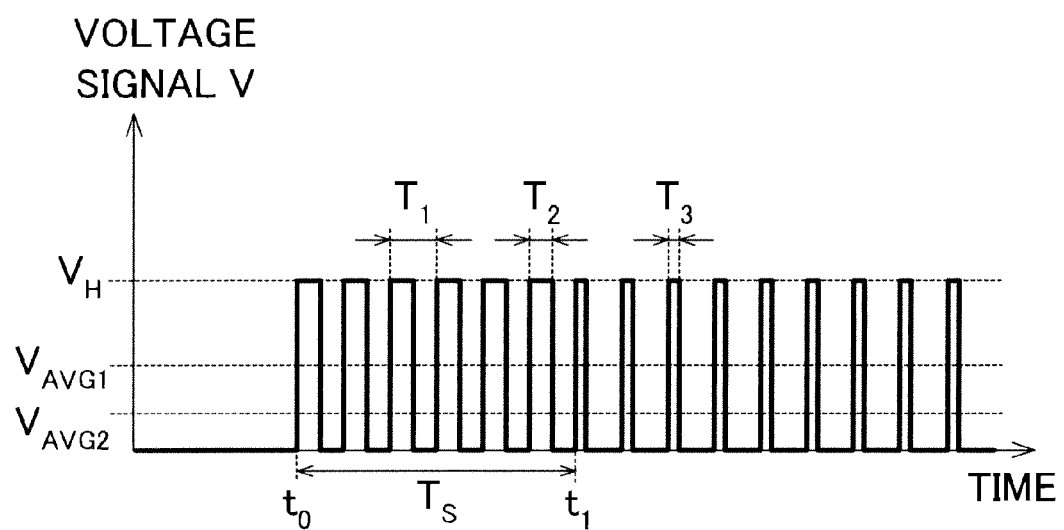
FIG. 6 is a chart showing a voltage signal.

The drive device 22 supplies the voltage signal V of a waveform shown in FIG. 6 to the motor 51 for the operation to restrain the occupant 120 with a weak force. This voltage signal V has a maximum voltage $V_H$ and a cycle $T_1$. The duty ratios $T_2/T_1$ and $T_3/T_1$ of the voltage signal V are adjusted so that the voltage signal V is periodically at a high level for a time $T_2$ from a time $t_0$ to a time $t_1$ and the voltage signal V is periodically at a high level for a time $T_3$ after the time $t_1$. Here, the time $t_0$ is the time when the retractor 50 starts operating. Furthermore, the time $t_1$ is the time when a time $T_S$ has elapsed since the time $t_0$.

More specifically, the duty ratio $T_2/T_1$ is set so that the voltage calculated by multiplying the maximum voltage $V_H$ by the duty ratio $T_2/T_1$ is $V_{AVG1}$. The voltage $V_{AVG1}$ is a voltage sufficiently greater than the minimum operation voltage of the motor 51. On the other hand, the duty ratio $T_3/T_1$ is set so that the voltage calculated by multiplying the maximum voltage $V_H$ by the duty ratio $T_3/T_1$ is $V_{AVG2}$. The voltage $V_{AVG2}$ is a voltage lower than the minimum operation voltage of the motor 51.

Figure 7:
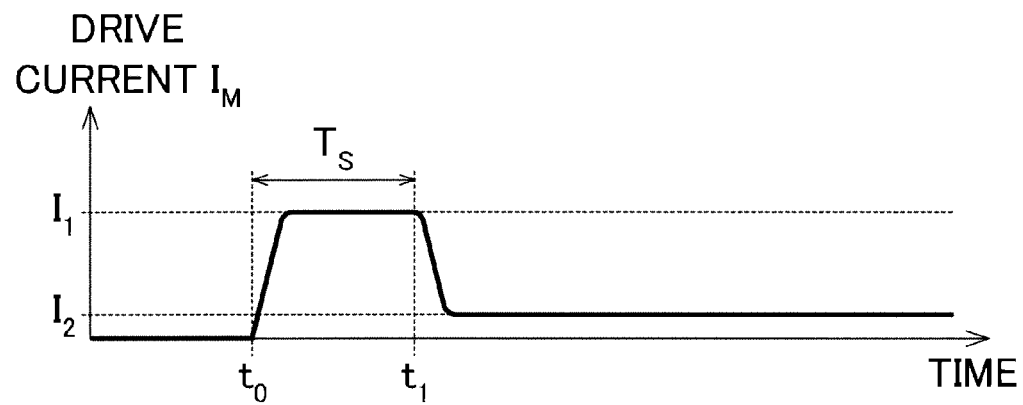
FIG. 7 is a chart showing the change in the drive current flowing through the motor.

FIG. 7 shows a curve presenting the change in the drive current $I_M$ flowing through the motor 51 when the voltage signal V shown in FIG. 6 is supplied. The drive current $I_M$ starts to rise at the time $t_0$ when the retractor 50 starts operating and keeps a value $I_1$ until the time $t_1$ when the time $T_S$ has elapsed since the time $t_0$. Then, the drive current $I_M$ has a value $I_2$ lower than the value $I_1$ after the time $t_1$.

The above time $T_S$ is a time necessary for the clutch 76 to operate so as to mechanically connect the motor 51 and spool 53. The time $T_S$ is approximately 20 ms. The value $I_1$ is a value greater than the current flowing through the motor 51 when the minimum operation voltage is applied to the motor 51. The value $I_2$ is a value of the current flowing through the motor 51 when the minimum voltage necessary for driving the motor 51 ($V_{AVG2}$) is applied.

As explained above, in this embodiment, the drive current $I_M$ of the motor 51 is increased in value for the time $T_S$ necessary for the clutch 76 to operate so as to mechanically connect the motor 51 and spool 53. Then, after the clutch 76 has operated, the drive current $I_M$ has a value necessary only for preventing the spool 53 from being rotated by the tension of the belt 40. Therefore, after the operation of the clutch 76 is ensured, the power necessary only for restraining the occupant 120 is consumed. Then, it is possible to reduce the power consumption of the motor 51 and suppress heat generation of the motor 51.

Furthermore, after the clutch 76 has operated, the voltage signal V has a value necessary only for preventing the spool 53 from being rotated. Then, the occupant 120 can feel less restrained.

In this embodiment, the average value of the voltage signal V supplied to the motor 51 is greater than the minimum operation voltage while the clutch 76 is in operation. Therefore, even if the minimum operation voltage is increased in value due to deterioration of the motor 51, the operation of the clutch 76 is ensured so as to mechanically connect the motor 51 and spool 53. Consequently, the occupant 120 can surely be restrained.

In this embodiment, the voltage signal V is PWM-controlled so that the average value of the voltage signal V is equal to or greater than the minimum operation voltage of the motor 51 while the clutch 76 is in operation. Therefore, the operation of the clutch 76 is ensured so as to mechanically connect the motor 51 and spool 53. Consequently, the occupant 120 can surely be restrained.

Incidentally, the maximum voltage of the voltage signal V varies depending on the circumstances surrounding the vehicle, battery charge state, degree of deterioration, and individual difference. In this case, the drive device 22 can perform PWM control with consideration of variation of the maximum voltage of the voltage signal V. More specifically, the drive device 22 compares the standard maximum voltage $V_H$ with the current voltage $V_R$. Then, the drive device 22 obtains a time $T_X$ for which the voltage signal V is at a high level using the formula (1) below. Then, the drive device 22 controls the voltage to be applied to the motor 51 so that the duty ratio of the voltage signal V is $T_X/T_1$.

$$T_X = T_2(V_H/V_R) \quad (1)$$

In this way, even if the battery voltage drops, the operation of the clutch 76 is ensured so as to mechanically connect the motor 51 and spool 53. Consequently, the occupant 120 can surely be restrained.

In this embodiment, as shown in FIG. 7, the voltage signal V is controlled so that the drive current $I_M$ of the minimum value necessary for restraining the occupant 120 is supplied after the clutch 76 has become on. However, the control of the voltage signal V according to this embodiment can be combined with control for restraining the occupant 120 with a strong force in the event that a large external force is applied to the occupant 120 due to vehicle behavioral change. For example, the voltage signal V can be controlled so that the drive current $I_M$ of a value equal to or greater than $I_1$ is supplied to the motor 51.

An embodiment of the present invention is described above. However, the present invention is not confined to the above embodiment. For example, the clutch 76 can have a spring for separating the pawl 76a from the internal gear 73. The pawl 76a surely engages with the ratchet tooth of the internal gear 73 when the voltage signal V has a value greater than the minimum operation voltage. Then, the drive current $I_M$ of a value that does not rotate the spool 53 is supplied to keep the pawl 76a engaged with the ratchet tooth of the internal gear 73. Therefore, the operation of the clutch 76 is ensured so as to mechanically connect the motor 51 and spool 53. Consequently, the occupant 120 can surely be restrained.

In the above embodiment, as seen from FIG. 6, the duty ratio of the voltage signal V is determined so that the duty ratio is $T_2/T_1$ until the time $T_S$ elapses since the time $t_0$ and the duty ratio is $T_3/T_1$ after the elapse of the time $T_S$. This is not restrictive. It is possible to detect the position of the pawl 76a, determine that the clutch 76 is on if the detection reveals that the pawl 76a has rotated to the position to engage with the internal gear 73, and change the duty ratio from $T_2/T_1$ to $T_3/T_1$. The position of the pawl 76a can be detected using a limit switch or proximity switch.

Furthermore, the clutch 76 becoming on can be detected by monitoring the rotation angle of the rotation shaft 51a of the motor 51 or the rotation angle of the spool 53 instead of directly detecting the position of the pawl 76a.

Figure 8:
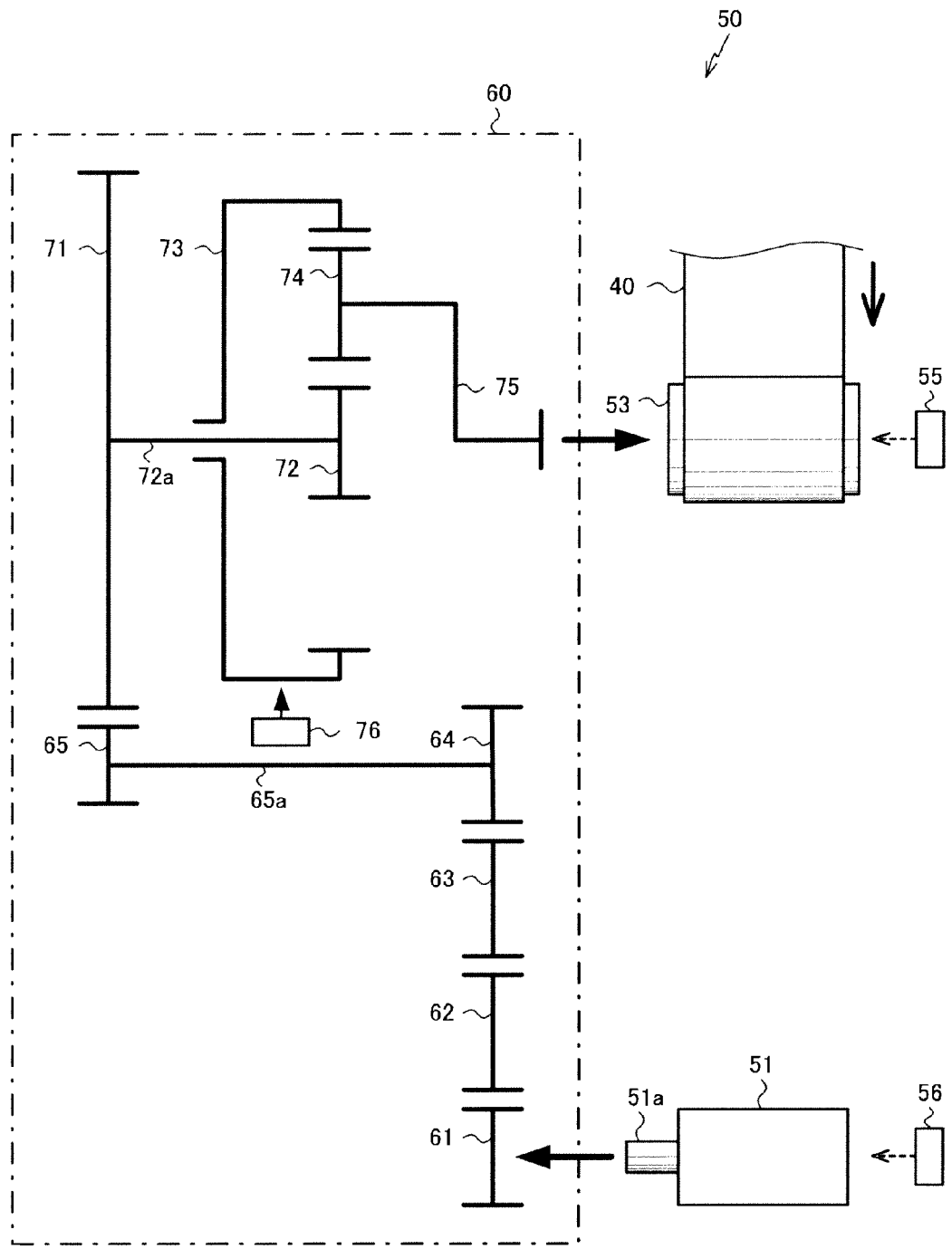
FIG. 8 is a diagram for explaining a modified embodiment of the restraining device.

FIG. 8 shows an encoder 56 detecting the rotation angle of the rotation shaft 51a constituting the motor 51 and an encoder 55 detecting the rotation angle of the spool 53. The clutch 76 becoming on can be detected by monitoring the rotation angle of the rotation shaft 51a using the encoder 56. For example, it can be determined that the pawl 76a is engaged with the ratchet tooth of the internal gear 73 and the clutch 76 is on when the rotation angle of the rotation shaft 51a is increased by a given quantity after the retractor 50 starts operating.

Similarly, the clutch 76 becoming on can be detected by monitoring the rotation angle of the spool 53 using the encoder 55. For example, it can be determined that the pawl 76a is engaged with the ratchet tooth of the internal gear 73 and the clutch 76 is on when the rotation angle of the spool 53 is increased by a given quantity after the retractor 50 starts operating.

When the clutch 76 is detected to be on as described above, the duty ratio of the voltage signal V can be changed from $T_2/T_1$ to $T_3/T_1$ without waiting for the time $T_S$ elapsing.

In the above embodiment, as shown in FIG. 6, the voltage signal V is controlled so that the duty ratio of the voltage signal V is $T_2/T_1$ for the time $T_S$ since the time $t_0$ when the motor 51 is activated in order to make the clutch 76 on. This is not restrictive and the voltage signal V can be controlled so that the duty ratio of the voltage signal V is $T_2/T_1$ for a given time each time the clutch 76 is detected to be off.

Figure 9:
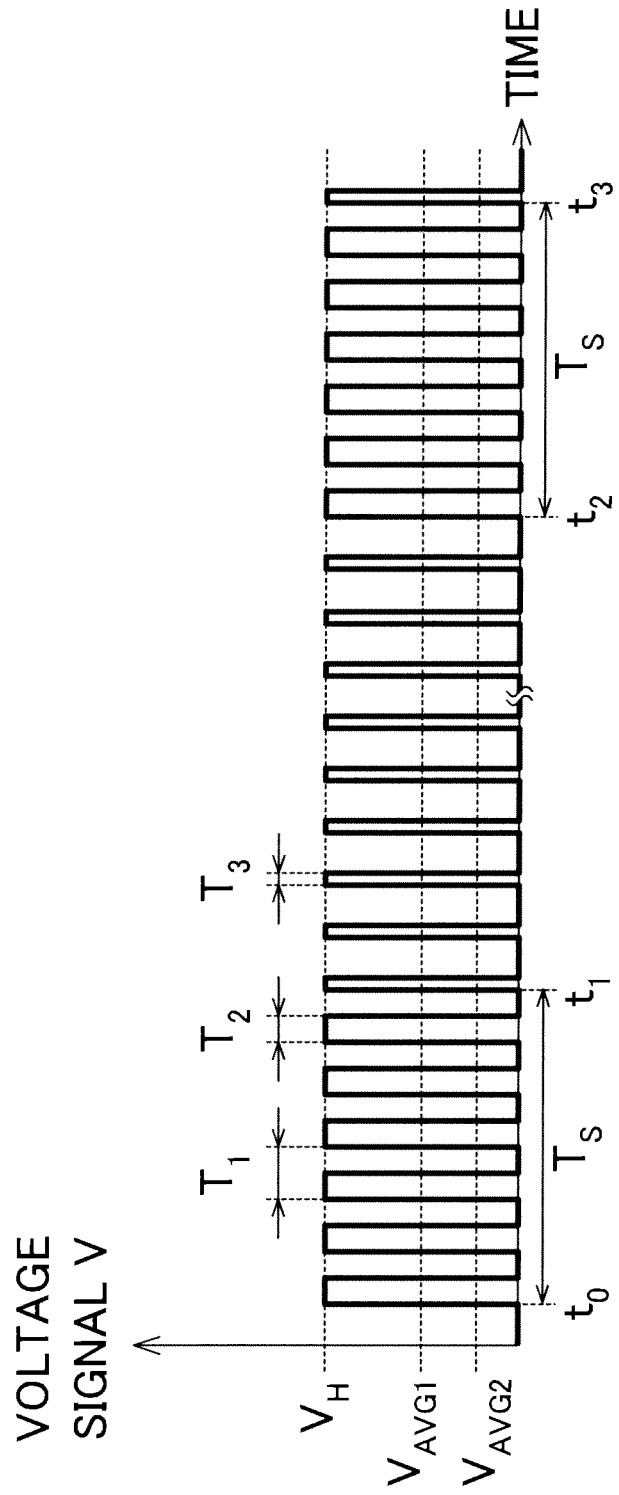
FIG. 9 is a chart showing a voltage signal.

In such a case, as seen from FIG. 9, the drive device 22 sets the duty ratio of the voltage signal V to $T_2/T_1$ for a time $T_S$ since the motor 51 starts driving so as to make the clutch 76 on. Then, when the clutch 76 is detected to be off at a time $t_2$, the drive device 22 sets the duty ratio of the voltage signal V to $T_2/T_1$ until the time $T_S$ elapses again so as to make the clutch 76 on. Consequently, the occupant 120 can surely be restrained while the vehicle is moving.

The clutch 76 becoming off can be detected by monitoring the rotation angle of the rotation shaft 51a using the encoder 56 shown in FIG. 8. For example, it is determined that the clutch 76 is off when the belt 40 is pulled out and the rotation angle of the motor 51 is increased by a given or more quantity while the retractor 50 is in operation.

Similarly, the clutch 76 becoming off can be detected by monitoring the rotation angle of the spool 53 using the encoder 55. For example, it is determined that the clutch 76 is off when the belt 40 is pulled out and the rotation angle of the spool 53 is increased by a given or more quantity while the retractor 50 is in operation.

When the clutch 76 is detected to be off as described above, the duty ratio of the voltage signal V is set to $T_2/T_1$ until the time $T_S$ elapses again so as to make the clutch 76 on. Consequently, the occupant 120 can surely be restrained while the vehicle is moving. Alternatively, the clutch 76 becoming off can directly be detected using the aforementioned proximity switch or limit switch.

In the above embodiment, the voltage signal V is controlled so that the duty ratio of the voltage signal V is $T_2/T_1$ for the time $T_S$ since the time $t_0$ when the motor 51 is activated as shown in FIG. 6 in order to make the clutch 76 on. This is not restrictive. The duty ratio of the voltage signal V can periodically be changed from $T_2/T_1$ to $T_3/T_1$ regardless of the state of the clutch 76. In this way, even if the clutch 76 becomes off, the clutch 76 can be made on in a time corresponding to one cycle. Then, the occupant 120 can surely be restrained while the vehicle is moving.

The control device 20 according to the above embodiment can be composed of hardware or a computer or microcomputer.

Various embodiments and modifications are available to the present invention without departing from the broad sense of spirit and scope of the present invention. The above-described embodiment is given for explaining the present invention and does not confine the scope of the present invention.

Having described and illustrated the principles of this application by reference to one (or more) preferred embodiment(s), it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A restraining device for restraining an occupant sitting in a seat, comprising:
    a spool winding up a belt for restraining the occupant;
    a motor rotating the spool;
    a gear unit transmitting an output of the motor to the spool;
    a clutch mechanically connecting the motor and the gear unit by means of the rotation of the motor; and a supply unit supplying power to the motor in the manner that a first power supplied until the motor and the gear unit are connected by the clutch is greater than a second power supplied after the motor and the gear unit are connected.

2. The restraining device according to claim 1, wherein the supply unit supplies power to the motor in the manner such that the average output voltage until the motor and the gear unit are connected is greater than the average output voltage after the motor and the gear unit are connected.

3. The restraining device according to claim 1, wherein the supply unit supplies power to the motor in the manner such that the current supplied until the motor and the gear unit are connected is greater than the current supplied after the motor and the gear unit are connected.

4. The restraining device according to claim 1, wherein the supply unit performs PWM control.

5. The restraining device according to claim 1, wherein the supply unit supplies the first power for a preset time.

6. The restraining device according to claim 1, comprising:
a first detection system detecting the connection between the motor and the gear unit by the clutch,
wherein the supply unit supplies the first power until the first detection system detects the connection between the motor and the gear unit.

7. The restraining device according to claim 1, comprising:
a second detection system detecting the disconnection between the motor and the gear unit,
wherein the supply unit supplies power to the motor in the manner that a first power supplied until the motor and the gear unit are connected is greater than a second power supplied after the motor and the gear unit are connected when the second detection system detects the disconnection between the motor and the gear unit.

8. The restraining device according to claim 1, wherein the supply unit periodically supplies power to the motor in the manner that a first power supplied until the motor and the gear unit are connected is greater than a second power supplied after the motor and the gear unit are connected.

9. The restraining device according to claim 1, wherein:
the spool is provided on one side of the seat, and
the restraining device comprises:
a fixture provided on one side of the seat and to which one end of the belt pulled out from a retractor is secured;
a support member supporting the belt between the spool and the fixture;
a buckle provided on the other side of the seat; and
a tongue provided on the belt and detachably fitted in the buckle.

* * * * *